United States Patent
Kuzuhara (10) Patent No.: US 11,769,917 B2
(45) Date of Patent: Sep. 26, 2023

(54) BATTERY MODULE

(71) Applicant: SUBARU CORPORATION, Tokyo (JP)

(72) Inventor: Fumihiro Kuzuhara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 434 days.

(21) Appl. No.: 16/432,081

(22) Filed: Jun. 5, 2019

(65) Prior Publication Data
US 2019/0393572 A1 Dec. 26, 2019

(30) Foreign Application Priority Data
Jun. 25, 2018 (JP) ................. 2018-119737

(51) Int. Cl.
| | |
|---|---|
| H01M 10/625 | (2014.01) |
| H01M 10/6562 | (2014.01) |
| H01M 10/613 | (2014.01) |
| H01M 50/30 | (2021.01) |
| H01M 50/35 | (2021.01) |
| H01M 10/6563 | (2014.01) |
| B60K 1/04 | (2019.01) |
| B60K 11/06 | (2006.01) |
| B60K 13/04 | (2006.01) |
| B60K 1/00 | (2006.01) |

(52) U.S. Cl.
CPC ............. *H01M 10/625* (2015.04); *B60K 1/04* (2013.01); *B60K 11/06* (2013.01); *B60K 13/04* (2013.01); *H01M 10/613* (2015.04); *H01M 10/6562* (2015.04); *H01M 50/30* (2021.01); *H01M 50/35* (2021.01); *B60K 2001/005* (2013.01); *B60K 2001/0416* (2013.01); *H01M 10/6563* (2015.04); *H01M 2200/20* (2013.01); *H01M 2220/20* (2013.01); *Y02E 60/10* (2013.01); *Y02T 10/70* (2013.01)

(58) Field of Classification Search
None
See application file for complete search history.

(56) References Cited

U.S. PATENT DOCUMENTS

2011/0027632 A1* 2/2011 Higashino ............... B60K 1/04
429/83

FOREIGN PATENT DOCUMENTS

| DE | 102014213916 A1 * | 1/2016 | ......... H01M 50/308 |
|---|---|---|---|
| JP | 2005339932 A * | 12/2005 | |
| JP | 2006-185894 | 7/2006 | |
| JP | 2011-171052 | 9/2011 | |
| JP | 2018-018754 | 2/2018 | |

OTHER PUBLICATIONS

Machine translation of DE-102014213916-A1 (Stein) (Year: 2014).*
Machine translation of JP 2005-339932 A (Matsushita) (Year: 2005).*

* cited by examiner

*Primary Examiner* — Maria Laios
(74) *Attorney, Agent, or Firm* — Smith, Gambrell & Russell, LLP (57) ABSTRACT

A battery module includes a battery stack, a battery cooling duct, and a gas exhaust duct. Cooling air for the battery stack flows through the battery cooling duct. A gas emitted from the battery stack flows through the gas exhaust duct. A middle portion of the gas exhaust duct is contained and shrunk in the battery cooling duct.

19 Claims, 6 Drawing Sheets

BATTERY MODULE

CROSS-REFERENCE TO RELATED APPLICATIONS

The present application claims priority from Japanese Patent Application No. 2018-119737 filed on Jun. 25, 2018, the entire contents of which are hereby incorporated by reference.

BACKGROUND

The disclosure relates to battery modules and more specifically to a battery module including a duct through which gas emitted from a battery is exhausted to the outside in an abnormal case.

In a hybrid or electric automobile, a high-capacity battery supplies electric power to a motor in order to apply driving force for the wheels. Such vehicles include a system configured to cool a battery, and a mechanism configured to exhaust gas emitted from a battery to the outside in an abnormal case.

Japanese Unexamined Patent Application Publication (JP-A) No. 2006-185894 describes a configuration in which gas emitted from an electric device is exhausted to the outside. Specifically, the configuration has a gas outlet configured to exhaust the gas to the outside. A first end of an exhaust gas passage communicating with the gas outlet is closed, and a second end of the exhaust gas passage has a gas outlet leading to the outside of a vehicle. In this way, the configuration allows gas to be exhausted to the outside and to be suppressed from being returned to the vehicle compartment.

Japanese Unexamined Patent Application Publication (JP-A) No. 2011-171052 describes a cell battery structure that has a coolant gas passage and an exhaust gas passage that are disposed separately and apart from each other. Specifically, the coolant gas passage allows cooling air for use in cooling the battery electrodes to flow therein. The exhaust gas passage allows a gas leaked from the battery electrodes to flow therein. Since both the coolant gas passage and the exhaust gas passage are disposed separately and apart from each other, the gas leaked from the battery in an abnormal case is less likely to flow into the coolant gas passage to be mixed with the coolant gas.

Japanese Unexamined Patent Application Publication (JP-A) No. 2018-18754 describes a cell pack that includes a duct through which gas emitted from the battery is exhausted to the outside. Specifically, the duct has an exhaust smoke passage formed along the entire stack of the battery cells. The configuration allows the battery cells to be efficiently cooled and their discharge property to be improved.

SUMMARY

A battery module according to an aspect of the disclosure includes a battery stack, a battery cooling duct through which air for cooling the battery stack flows, and a gas exhaust duct through which a gas emitted from the battery stack flows. A middle portion of the gas exhaust duct is contained and shrunk in the battery cooling duct.

DETAILED DESCRIPTION

An embodiment of the disclosure will be described below with reference to the accompanying drawings.

In the techniques described in JP-A No. 2006-185894, No. 2011-171052, and No. 2018-18754, the passage of gas generated in an abnormal case may be difficult to be compactly disposed inside a vehicle.

In the technique described in JP-A No. 2006-185894, the exhaust gas passage through which gas is exhausted to the outside in an abnormal case is disposed along the entire length of the batteries to occupy a large space, which may hinder compactness of the battery module.

In the technique described in JP-A No. 2011-171052, the exhaust gas passage, which is disposed separately and apart from the coolant gas passage, occupies a relatively large space, which may decrease an available space in the vehicle compartment.

In the technique described in JP-A No. 2018-18754, the exhaust smoke passage, through which gas is exhausted to the outside in an abnormal case, is formed along the entire length of the battery cells, thereby occupying a large space inside the vehicle.

It is desirable to provide a battery module having a passage that allows gas to be exhausted to the outside in an abnormal case and that can be shrunk in a normal case.

A battery module 10 according to an embodiment of the disclosure will be described below.

Figure 1:
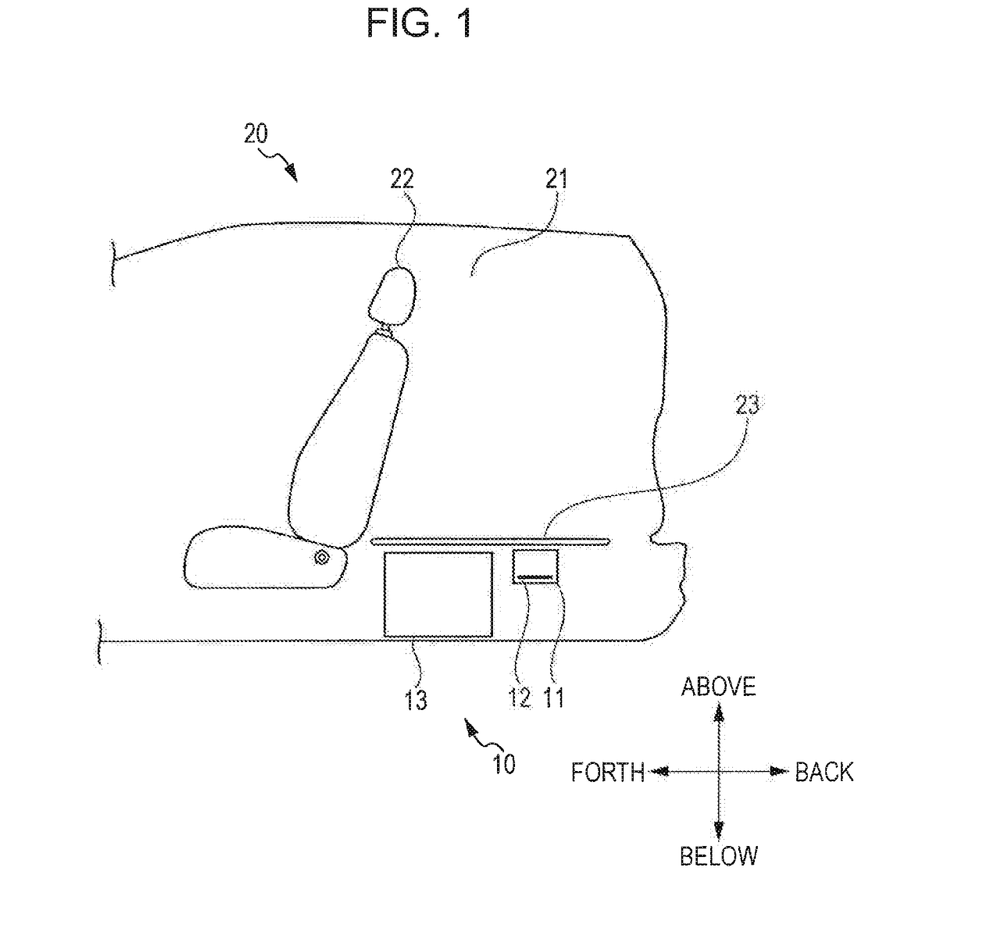
FIG. 1 illustrates a longitudinal cross section of a vehicle equipped with a battery module according to an embodiment of the disclosure.

With reference to FIG. 1, a vehicle 20 including the battery module 10 will be described below. The vehicle 20 may be an electric or hybrid automobile. If the vehicle 20 is an electric automobile, a motor in the vehicle 20 serves as a drive source to rotate with electric power supplied from the battery module 10, thereby running the vehicle 20. If the vehicle 20 is a hybrid automobile, one or both of a motor and an engine in the vehicle 20 serve as drive sources to run the vehicle 20.

The battery module 10 is disposed behind and diagonally below a rear seat, or a seat 22, and covered with a partition plate 23. Alternatively, the battery module 10 may be disposed directly below the seat 22. The battery module 10 may be a lithium battery module, for instance. Herein, the battery module 10 may also be referred to as the cell pack.

The battery module 10 includes a battery cooling duct 11, a gas exhaust duct 12, and a battery stack 13.

In this embodiment, the battery stack 13 is disposed in a vehicle compartment 21 where a passenger is present. If the battery stack 13 emits gas in an abnormal case, it is desirable to release this gas from the vehicle compartment 21 to the outside in order to ensure the passenger's security. In the vehicle 20, even if the battery module 10 emits gas in an abnormal case, this gas is exhausted to the outside through the gas exhaust duct 12 without staying inside the vehicle compartment 21.

Figure 2:
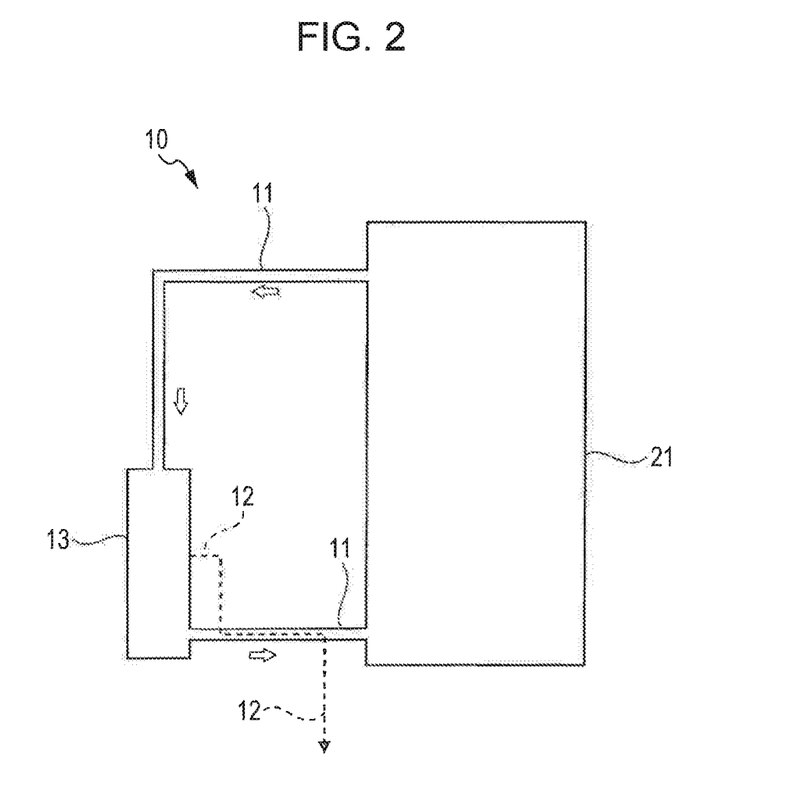
FIG. 2 schematically illustrates the battery module.

FIG. 2 schematically illustrates the battery module 10. Components of the battery module 10 are the battery cooling duct 11, the gas exhaust duct 12, and the battery stack 13. The battery module 10 cools the battery stack 13 during charging or discharging of the battery stack 13 and exhausts gas to the outside in an abnormal case.

The battery cooling duct 11 is coupled to both the vehicle compartment 21 and a housing of the battery stack 13. Air circulates through the battery cooling duct 11, the vehicle compartment 21, and the battery stack 13. An unillustrated fan that creates an air current from the vehicle compartment 21 to the battery stack 13 may be disposed in the battery module 10. In FIG. 2, the flow direction of air in the battery cooling duct 11 is designated by the arrows.

The gas exhaust duct 12 serves as a passage along which gas emitted from the battery stack 13 is exhausted to the outside in an abnormal case. A first end of the gas exhaust duct 12 is coupled to gas exhaust valves of the batteries in the battery stack 13. A second end of the gas exhaust duct 12 leads to the outside.

In this embodiment, a middle portion of the gas exhaust duct 12 is folded inside the battery cooling duct 11. If the battery module 10 emits no gas in a normal case, the gas exhaust duct 12 is shrunk to occupy only a small space. If battery stacks become larger in size and emit larger amounts of gas in an abnormal case, gas exhaust ducts also tend to become larger in volume. In the battery module 10 according to this embodiment, however, the middle portion of the gas exhaust duct 12 is shrunk inside the battery cooling duct 11. Even if the battery stack 13 becomes large in size, the gas exhaust duct 12 can be still small in volume. Consequently, the battery module 10 can achieve compactness.

Figure 3A:
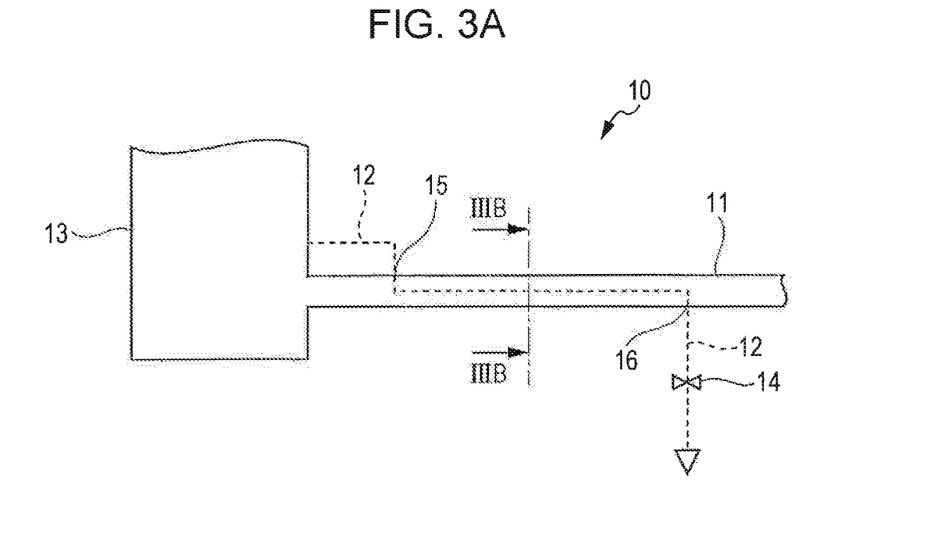
FIG. 3A schematically illustrates a part of the battery module in an enlarged manner.
Figure 3B:
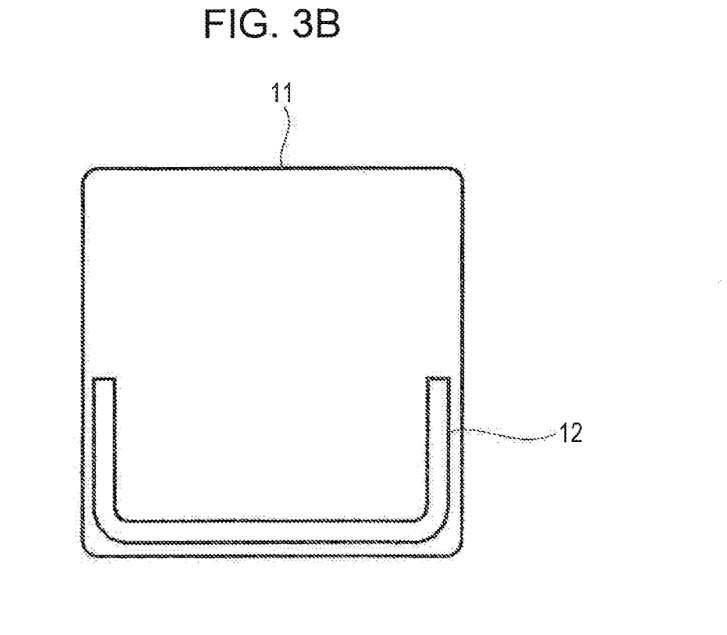
FIG. 3B illustrates a cross section of a battery cooling duct taken along the line IIIB-IIIB of FIG. 3A.

With reference to FIGS. 3A and 3B, a description will be given below of details of a configuration of the battery module 10. FIG. 3A schematically illustrates a part of the battery module 10 in an enlarged manner; FIG. 3B illustrates a cross section of the battery cooling duct 11 taken along the line IIIB-IIIB of FIG. 3A.

As illustrated in FIG. 3A, as described above, the middle portion of the gas exhaust duct 12 is contained in the battery cooling duct 11. The gas exhaust duct 12 merges into a first part 15, which is a midway point of the battery cooling duct 11 and branches off from a second part 16, which is another midway point of the battery cooling duct 11. In short, the middle portion of the gas exhaust duct 12 is contained in the battery cooling duct 11 between the first part 15 and the second part 16.

A portion of the gas exhaust duct 12 branching off from the second part 16 has a valve 14, which keeps shutting until an internal pressure of the gas exhaust duct 12 reaches a predetermined value. When the compartment pressure reaches the predetermined value, the valve 14 opens. Providing the valve 14 in the gas exhaust duct 12 can expand or shrink the gas exhaust duct 12 inside the battery cooling duct 11 in accordance with the pressure of gas generated in an abnormal case. Details of this will be described later.

As illustrated in FIG. 3B, the gas exhaust duct 12 is shrunk and contained in the battery cooling duct 11. Further, the gas exhaust duct 12 is folded and placed on the inner bottom of the battery cooling duct 11. When the battery stack 13 emits no gas in a normal case, the cross-sectional area of the gas exhaust duct 12 decreases relative to that of the battery cooling duct 11, thereby reversing a large available area in which cooling air for the battery stack 13 flows.

Figure 4A:
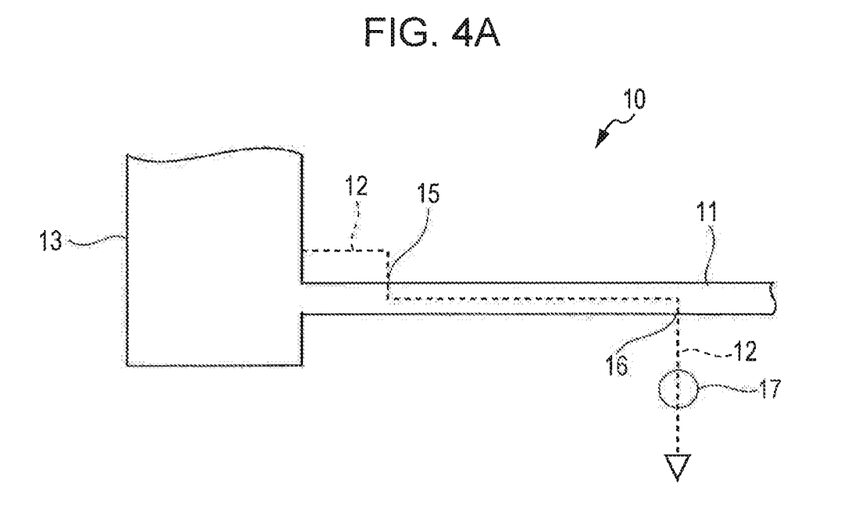
FIG. 4A schematically illustrates a part of the battery module in an enlarged manner.
Figure 4B:
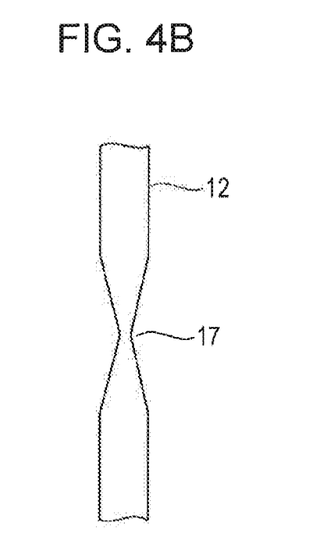
FIG. 4B illustrates a gas exhaust duct provided with a drawn member.

With reference to FIGS. 4A and 4B, a description will be given of a battery module 10 according to another example of the disclosure. FIG. 4A schematically illustrates a part of the battery module 10 in an enlarged manner; FIG. 4B illustrates a drawn member 17 provided with the gas exhaust duct 12.

As illustrated in FIG. 4A, a portion of the gas exhaust duct 12 which branches off from a second part 16 of a battery cooling duct 11 has the drawn member 17.

As illustrated in FIG. 4B, the gas exhaust duct 12 is partly narrowed in the drawn member 17. Forming the drawn member 17 can increase an internal resistance of the gas exhaust duct 12. The drawn member 17 produces substantially the same effect as that of the valve 14 illustrated in FIG. 3A. If the battery stack 13 emits gas, a pressure loss of the gas becomes higher in the drawn member 17, thereby increasing an internal pressure of the gas exhaust duct 12. In which case, the gas exhaust duct 12 is expanded inside the battery cooling duct 11. This configuration can be fabricated at a lower cost, because the drawn member 17 can be formed from the gas exhaust duct 12.

Figure 5A:
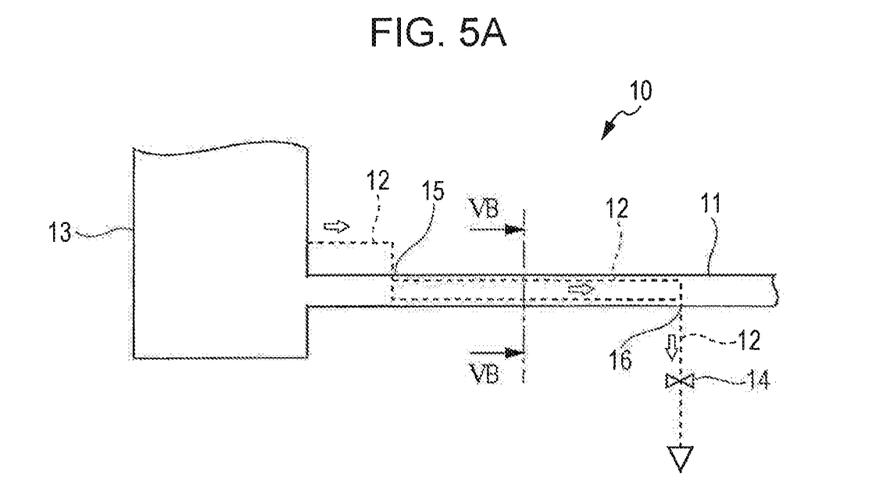
FIG. 5A schematically illustrates a part of the battery module in an enlarged manner.
Figure 5B:
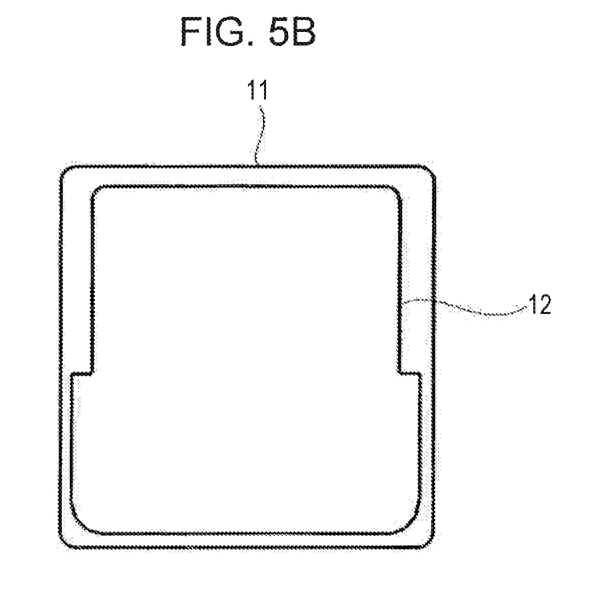
FIG. 5B illustrates a cross section of the gas exhaust duct taken along the line VB-VB of FIG. 5A.

With reference to FIGS. 5A and 5B, a description will be given below of a function of the battery module 10 when the battery stack 13 emits gas in an abnormal case. FIG. 5A schematically illustrates a part of the battery module 10 in an enlarged manner; FIG. 5B illustrates a cross section of the gas exhaust duct 12 taken along the line VB-VB of FIG. 5A.

As illustrated in FIG. 5A, when the battery stack 13 emits gas in an abnormal case, this gas flows into the gas exhaust duct 12. As described above, the downstream end of the gas exhaust duct 12 is closed by the valve 14. As a result, increasing pressure of the gas that has flown into the gas exhaust duct 12 expands the gas exhaust duct 12 inside the battery cooling duct 11.

When the internal pressure of the gas exhaust duct 12 is less than the predetermined value, the valve 14 shuts and closes the downstream end of the gas exhaust duct 12. When the internal pressure of the gas exhaust duct 12 becomes the predetermined value, the valve 14 stops shutting and opens the downstream end of the gas exhaust duct 12. Still, the gas exhaust duct 12 continues to be expanded until the internal pressure of the gas exhaust duct 12 inside the battery cooling duct 11 becomes constant.

FIG. 5B illustrates the cross sections of the battery cooling duct 11 and the expanded gas exhaust duct 12. In this case, the gas is filled in the gas exhaust duct 12 and expands the gas exhaust duct 12. In this case, the gas exhaust duct 12 is expanded until the cross-sectional area of the gas exhaust duct 12 becomes nearly equal to that of the battery cooling duct 11. As a result, for instance, the outer surface of the gas exhaust duct 12 may make substantially close contact with the inner surface of the battery cooling duct 11.

Expanding the battery cooling duct 11 in the above manner can reserve a space for the gas current inside the gas exhaust duct 12.

The expanded gas exhaust duct 12 clogs the battery cooling duct 11. In this case, even if the gas exhaust duct 12 leaks the gas, this gas does not flow to the vehicle compartment through the battery cooling duct 11.

The battery cooling duct 11 may be made of a harder material than that of the gas exhaust duct 12. Examples of this material include polypropylene (PP) and polyamide (PA). The battery cooling duct 11 made of a hard resin can resist being deformed to reserve a sufficiently large internal space.

The gas exhaust duct 12 may be made of a soft material, such as rubber. The gas exhaust duct 12 made of a soft material is folded as illustrated in FIG. 3B when the battery stack 13 emits no gas in a normal case, thereby reserving a space for cooling air inside the battery cooling duct 11. In contrast, when the battery stack 13 emits gas in an abnormal case, the gas exhaust duct 12 is expanded inside the battery cooling duct 11 as illustrated in FIG. 5B, thereby reserving a large space for the gas inside the gas exhaust duct 12.

Figure 6A:
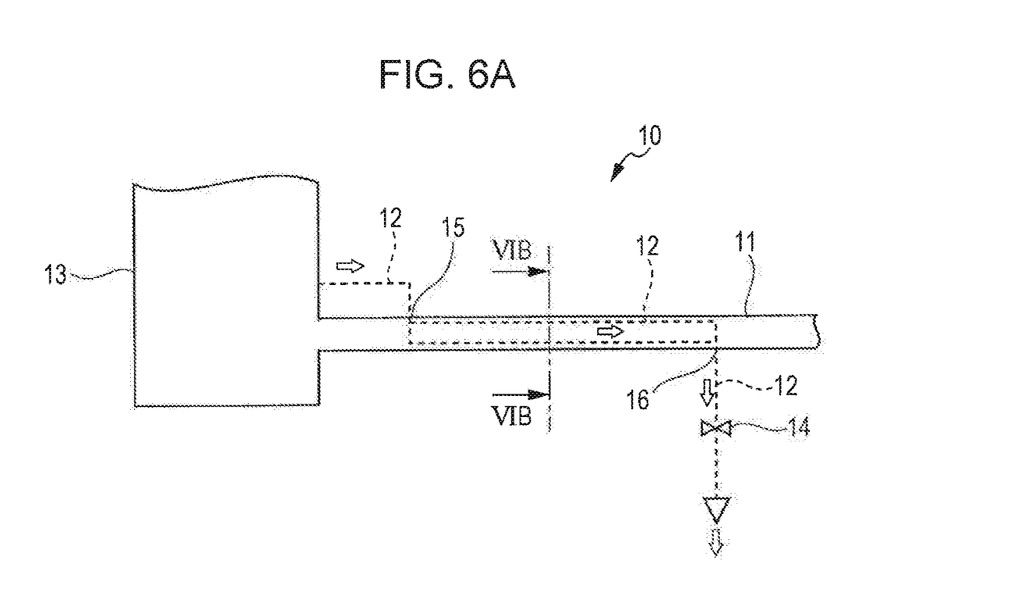
FIG. 6A schematically illustrates a part of the battery module in an enlarged manner.
Figure 6B:
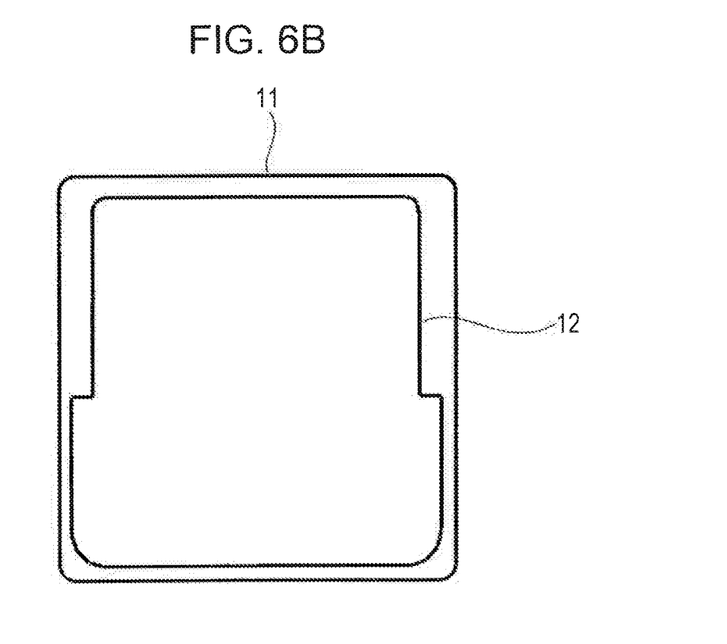
FIG. 6B illustrates a cross section of the gas exhaust duct taken along the line VIB-VIB of FIG. 6A.

As illustrated in FIGS. 6A and 6B, when the internal pressure of the gas exhaust duct 12 becomes the predetermined value, the valve 14 opens. Then, the gas emitted from the battery stack 13 is exhausted to the outside of the vehicle 20 through the gas exhaust duct 12 and the valve 14. As a result, even if the emitted gas is poisonous, the poisonous gas does not flow into the vehicle compartment 21 where the passenger is present.

The embodiment of the disclosure has been described; however, the disclosure is not limited to this embodiment.

As illustrated in FIG. 2, the middle portion of the gas exhaust duct 12 is contained in the portion of the battery cooling duct 11 through which air that has cooled the battery stack 13 flows. As an alternative instance, however, the middle portion of the gas exhaust duct 12 may be contained in a portion of the battery cooling duct 11 through which air that will cool the battery stack 13 flows.

A battery module according to an embodiment of the disclosure includes a battery stack, a battery cooling duct through which cooling air for the battery stack flows, and a gas exhaust duct through which a gas emitted from the battery stack flows. A middle portion of the gas exhaust duct is contained and shrunk in the battery cooling duct. By placing the middle portion of the gas exhaust duct inside the battery cooling duct, a space in a vehicle compartment occupied by the gas exhaust duct can be decreased, and an available space in the vehicle compartment thereby can be increased. In addition, the gas exhaust duct that is shrunk inside the battery cooling duct does not occupy a large internal space. The cooling air, therefore, can flow smoothly through the cooling duct without being affected by the gas exhaust duct.

In the battery module, the battery cooling duct may have a first end and a second end. Air may be introduced from the vehicle compartment into the battery cooling duct via the first end, then may cool the battery stack, and may be returned to the vehicle compartment via the second end. The battery cooling duct through which the cooling air for the battery stack circulates can be disposed near the gas exhaust duct. Therefore, at least a portion of the gas exhaust duct can be disposed inside the battery cooling duct.

In the battery module, the battery stack may be disposed inside the vehicle compartment. In general, if a battery stack is disposed inside a vehicle compartment, it is desirable to reserve a space for a gas exhaust duct through which gas is exhausted from the vehicle compartment to the outside, inside the vehicle compartment. In this battery module, however, at least a portion of the gas exhaust duct is contained in the battery cooling duct. Installing the gas exhaust duct in this manner can suppress an available space in the vehicle compartment to be decreased excessively.

In the battery module, the gas exhaust duct may be made of a softer material than a material of the battery cooling duct. The gas exhaust duct that may be made of a soft material can be expanded easily by the pressure of gas emitted from the battery stack.

In the battery module, a valve may be disposed at a midway point of the gas exhaust duct. When the battery stack emits the gas, the valve may shut to close the gas exhaust duct, and the gas exhaust duct may be expanded inside the battery cooling duct. When an internal pressure of the gas exhaust duct becomes a predetermined value, the valve may open to cause the gas to be exhausted to an outside of a vehicle through the gas exhaust duct. With a simple configuration in which the valve is disposed at the midway point of the gas exhaust duct, the gas exhaust duct made of a soft material can be expanded inside the battery cooling duct by the pressure of the gas emitted from the battery stack.

In the battery module, when the gas exhaust duct is expanded, an outer surface of the gas exhaust duct may make substantially close contact with an inner surface of the battery cooling duct. In this case, the expanded gas exhaust duct clogs the battery cooling duct, thereby suppressing the gas from flowing into the vehicle compartment through the battery cooling duct.

In the battery module, a portion of the gas exhaust duct which branches off from the battery cooling duct and may have a drawn member. Pressure loss of the gas increases in this drawn member. If gas is generated in an abnormal case, the gas exhaust duct is expanded inside the battery cooling duct by the pressure of the gas.

The invention claimed is:

1. A battery module comprising:
   a battery stack;
   a battery cooling duct through which air for cooling the battery stack flows; and
   a gas exhaust duct through which a gas emitted from the battery stack flows, the gas exhaust duct includes a first portion being at an inlet end of the gas exhaust duct and receiving the gas emitted from the battery stack, with the inlet end of the exhaust duct extending external to the battery cooling duct as not to be in contact with the air for cooling the battery stack, and a second portion of the exhaust duct is downstream and in gas exhaust flow communication with the first portion, with the second portion extending through and into the battery cooling duct such that the second portion of the gas exhaust duct is contained and shrunk in the battery cooling duct and such that cooling air contacts the second portion contained and shrunk within the battery cooling duct as the cooling air passes over the second portion contained and shrunk within the battery cooling duct, and wherein the second portion, when shrunk within the battery cooling duct, is placed on an inner, bottom surface of the battery cooling duct.

2. The battery module according to claim 1, wherein
   the battery cooling duct has a first end and a second end, and
   air is introduced from a vehicle compartment into the battery cooling duct via the first end, cools the battery stack, and is returned to the vehicle compartment via the second end.

3. The battery module according to claim 2, wherein
   the battery stack is disposed inside the vehicle compartment.

4. The battery module according to claim 3, wherein
   the gas exhaust duct is made of a material softer than a material of the battery cooling duct.

5. The battery module according to claim 3, wherein when the gas exhaust duct is expanded, an outer surface of the second portion of the gas exhaust duct makes substantially close contact with an inner surface of the battery cooling duct as to go from a cooling air flow passage over the shrunk second portion state to a cooling air flow passage clogging state.

6. The battery module according to claim 2, wherein
the gas exhaust duct is made of a material softer than a material of the battery cooling duct.

7. The battery module according to claim 2, wherein when the gas exhaust duct is expanded, an outer surface of the second portion of the gas exhaust duct makes substantially close contact with an inner surface of the battery cooling duct as to go from a cooling air flow passage over the shrunk second portion state to a cooling air flow passage clogging state.

8. The battery module according to claim 1, wherein
the gas exhaust duct is made of a material softer than a material of the battery cooling duct.

9. The battery module according to claim 1, further comprising a valve disposed within an intermediate region of the gas exhaust duct, wherein
when the battery stack emits the gas, the valve shuts to close the gas exhaust duct, so that the gas exhaust duct is expanded inside the battery cooling duct, and
when an internal pressure of the gas exhaust duct becomes a predetermined value, the valve opens to cause the gas to be exhausted to an outside of a vehicle through the gas exhaust duct.

10. The battery module according to claim 1, wherein when the gas exhaust duct is expanded, an outer surface of the second portion of the gas exhaust duct makes substantially close contact with an inner surface of the battery cooling duct as to go from a cooling air flow passage over the shrunk second portion state to a cooling air flow passage clogging state.

11. The battery module according to claim 1, wherein a third portion of the gas exhaust duct extends downstream from the second portion of the exhaust duct as to extend external to the battery cooling duct and the third portion includes a drawn member.

12. The battery module according to claim 1, wherein an overlapping region of each of the battery cooling duct and the gas exhaust duct is configured to maintain the air for cooling and the gas separate from each other.

13. The battery module according to claim 1, wherein a third portion of the gas exhaust duct extends downstream from the second portion of the gas exhaust duct and extends through the battery cooling duct within an intermediate region of the battery cooling duct.

14. The battery module according to claim 13, wherein the third portion of the gas exhaust duct extends through and out of the battery cooling duct at a location downstream from where the second portion extends through and into the battery cooling duct.

15. The battery module according to claim 1, wherein the second portion has an annular surface configuration that is fully received within the battery cooling duct both when shrunk and when fully expanded.

16. A battery module comprising:
a battery stack;
a battery cooling duct through which air for cooling the battery stack flows, the battery cooling duct includes a tube portion with closed cross section, the tube portion is coupled to both a vehicle compartment and a housing of the battery stack; and
a gas exhaust duct through which a gas emitted from the battery stack flows into an inlet end of the gas exhaust duct, the inlet end of the gas exhaust duct is configured to extend externally to the battery cooling duct as not to be in contact with the air for cooling the battery stack and through and into the battery cooling duct at a first merger location, with a duct portion of the gas exhaust duct, that is contained within the tube portion of the battery cooling duct, being shrunk in the battery cooling duct as to be in contact with the cooling air passing over that duct portion of the exhaust duct contained and shrunk within the tube portion of the battery cooling duct, and wherein, upon expansion of the duct portion, the duct portion clogs the tube portion thereby avoiding any leaked exhaust gas from the gas exhaust duct flowing into the vehicle compartment.

17. The battery module according to claim 16, wherein the gas exhaust duct includes another portion that extends through and out of the battery cooling duct at a second merger location positioned downstream of the first merger location and upstream from an outlet end of the battery cooling duct.

18. The battery module according to claim 16, wherein the second portion, when shrunk within the battery cooling duct, is placed, in a folded state, on an inner, bottom surface of the battery cooling duct.

19. A battery module comprising:
a battery stack;
a battery cooling duct through which air for cooling the battery stack flows; and
a gas exhaust duct through which a gas emitted from the battery stack flows into an inlet end of the gas exhaust duct, the inlet end of the gas exhaust duct is configured to extend externally to the battery cooling duct as not to be in contact with the air for cooling the battery stack and through and into the battery cooling duct at a first merger location, with a duct portion of the gas exhaust duct, that is contained within the battery cooling duct, being shrunk in the battery cooling duct as to be in contact with the cooling air passing over that duct portion of the exhaust duct contained and shrunk within the battery cooling duct, and wherein the duct portion has a peripheral surface that has an annular configuration when expanded and which duct portion is fully received within the battery cooling duct both when shrunk and when fully expanded.

\* \* \* \* \*